Figure 1:
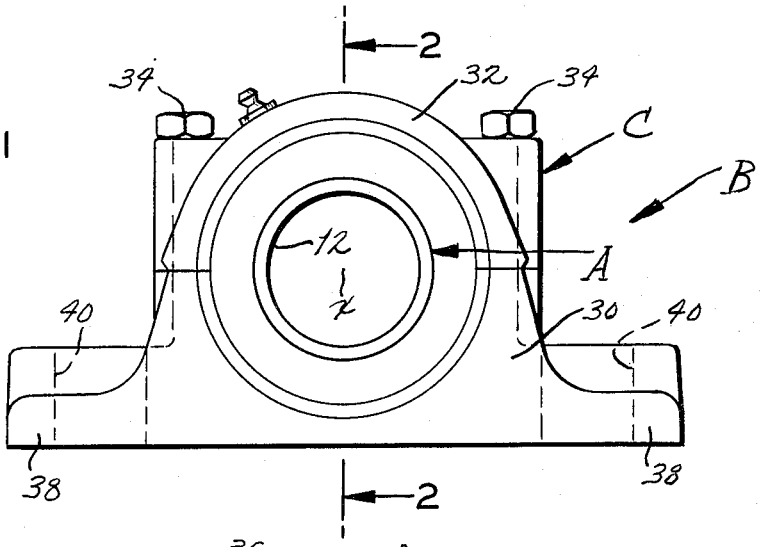
Figure 2:
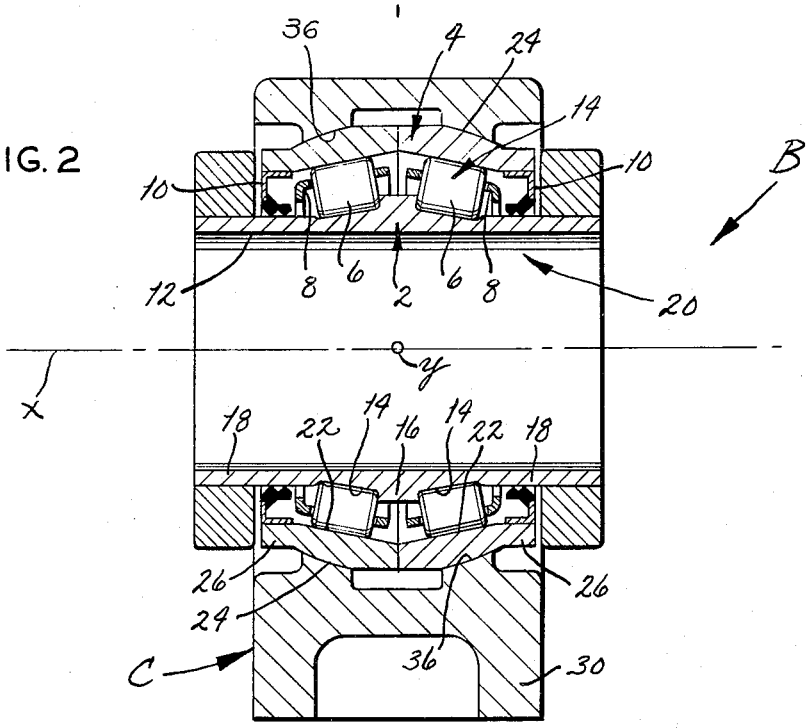
Figure 3:
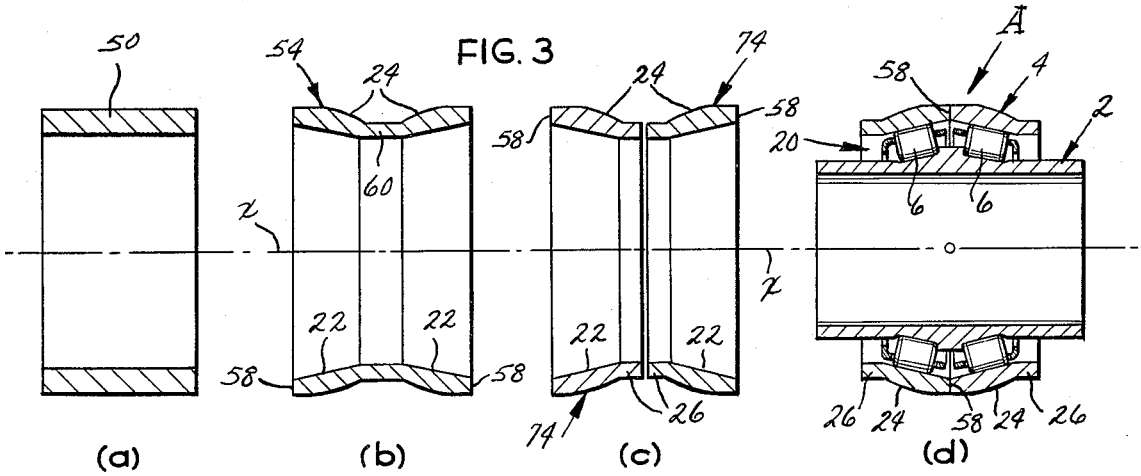

United States Defensive Publication [19] (H) [11] T102,401

Toth [43] Nov. 2, 1982

[54] PROCESS FOR MANUFACTURING A SELF-ALIGNING ANTIFRICTION BEARING AND RACE THEREFOR

[76] Inventor: David G. Toth, 6866 Corrine Dr., NW., Canton, Ohio 44718

[21] Appl. No.: 253,215

[22] Filed: Apr. 13, 1981

[51] Int. Cl.[3] ..... B21D 53/10; B21H 1/16; B21H 1/12; B21K 1/04

[52] U.S. Cl. ..... 29/148.4 R

[57] ABSTRACT

An externally self-aligning tapered roller bearing, which is particularly useful in pillow blocks, utilizes a conventional double row cone assembly, the rollers of which are in the direct orientation. The cup, however, is derived from a tubular slug which is roll-formed into an intermediate shape having inwardly presented raceways opening out of each end and an outwardly presented spherical surface leading up to each end. The intermediate shape is severed intermediate its ends into two single cups, each having a tapered raceway, a spherical surface, and a front face at the large diameter end of its raceway. The two single cups are thereafter reversed in position such that the front faces are opposed, and installed over the double row cone assembly, with each cup surrounding a different row of rollers on the cone assembly. The two cups are then confined within the pillow block housing with their front faces in abutment or in close proximity. The bearing assembly which is thereby formed has the centers for the two spherical surfaces essentially located at a common point along the axis of rotation for the bearing.

10 Claims, 2 Sheets Drawing,

18 Pages Specification

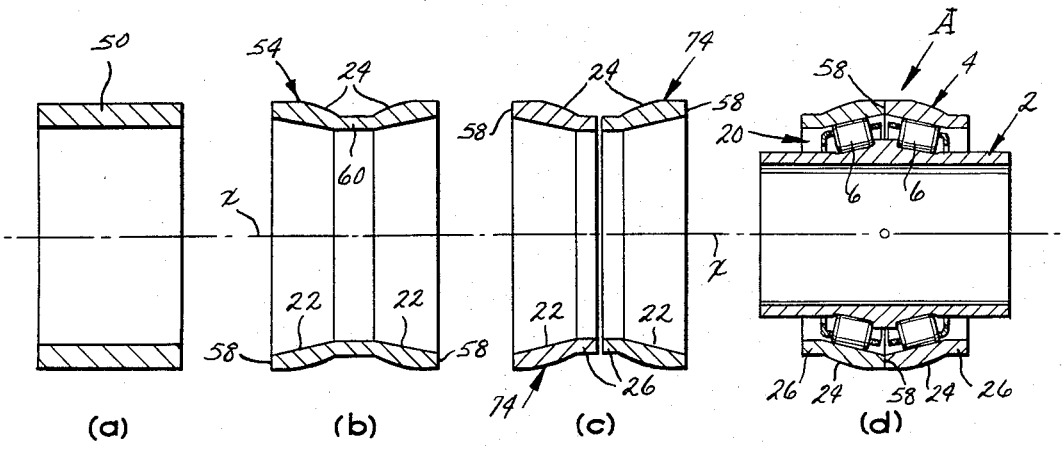

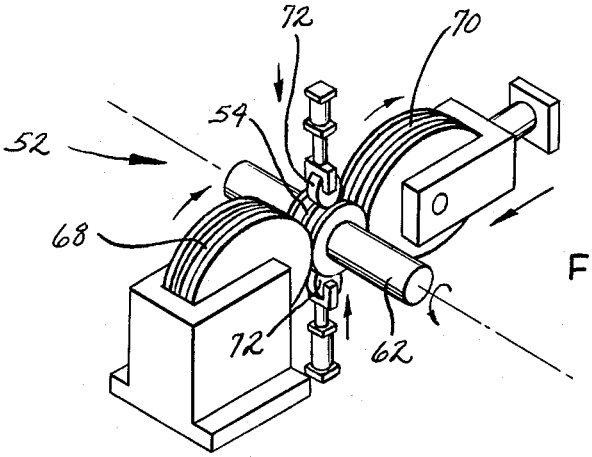
FIG. 4
FIG. 5
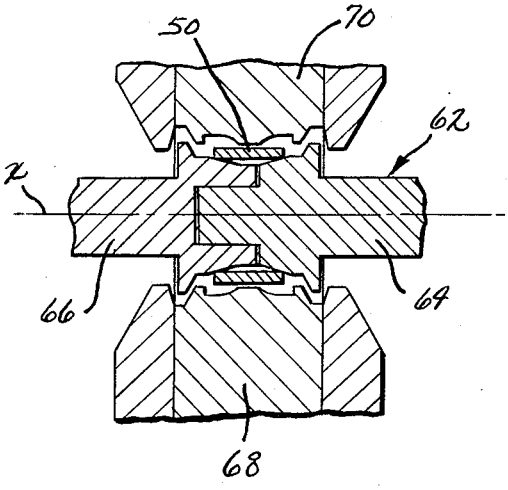
FIG. 6
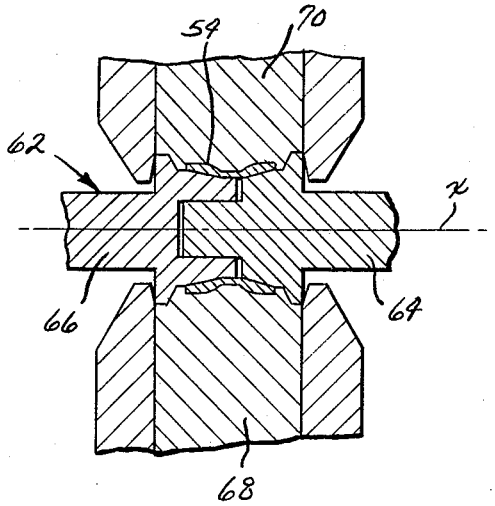

The file of this unexamined application may be inspected and copies thereof may be purchased (849 O.G. 1221, Apr. 9, 1968).